UNITED STATES PATENT OFFICE.

JOHN TUCKWELL, OF GLASGOW, SCOTLAND.

MANUFACTURE OF ARTIFICIAL MARBLE.

SPECIFICATION forming part of Letters Patent No. 677,385, dated July 2, 1901.

Application filed February 23, 1901. Serial No. 48,454. (No specimens.)

*To all whom it may concern:*

Be it known that I, JOHN TUCKWELL, engineer, a subject of the King of Great Britain and Ireland, and a resident of the city of Glasgow, Scotland, have invented certain new and useful Improvements in the Manufacture of Artificial Marble, (for which an application for a patent has been filed in Great Britain, No. 15,830, dated September 6, 1900,) of which the following is a specification.

The object of the invention is the manufacture of imitation marble and the like, such as granite or other distinctively-marked stone; and it consists of a new or improved admixture of materials and process for preparing such imitation marble which is fireproof, waterproof, and ornamental and can be prepared in the form of slabs, tiles, moldings, or other shapes.

According to my improvements I form an admixture of materials consisting of one part each, by weight, of the cement known as "Keene's marble-cement" and of fine white silver sand, and to the said mixture I add ground alum in the proportion of about one part to two hundred parts of the mixture and litharge-powder in the proportion of five per cent. of the whole. When extra hardness of finished material is required, I use two parts, by weight, of Parian cement, one part of Keene's marble-cement, and one part of white silver sand, with ground alum and litharge-powder in the proportions mentioned. When the finished material is desired of a uniform color all through, the necessary coloring-matter is added. These materials are intimately mixed together in a dry state, then formed into a thin paste with sufficient water. For the production of slabs or tiles of this material the paste is run into shallow molds, preferably formed of wood sides resting on a sheet of glass or other material capable of imparting a polished surface, and allowed to set and harden. The bottom of the mold may, however, be formed of or covered with any other suitable substance, such as polished zinc, and may be shaped to suit articles, such as moldings, being manufactured.

When plain white or colored slabs, tiles, moldings, or other articles are desired, these after removal from the mold when set are coated with enamel-paint of the required tint and are then baked in a suitable oven at a temperature of about 155° Fahrenheit, afterward polished with rottenstone or tripoli-powder and water, coated with a suitable varnish, such as spar-varnish, stoved again at the same temperature, and polished while still warm with a composition of beeswax one pound, turpentine one-half pint, and precipitated chalk one-half ounce, rubbed over the surface with a soft rag and polished off with chamois-leather or a soft cloth until the desired polish is produced.

To prevent damp from affecting slabs or tiles when used on walls, it is preferred to coat their backs with boiled linseed or litharge oil. On slabs so prepared, but not finally polished with the beeswax composition, any device—such as flowers, landscapes, and the like—can be painted in suitable colors, varnished over, and stoved at a temperature of about 155°. They are then lightly rubbed down with rottenstone and water and polished with the beeswax composition.

In order to produce marble, granite, or other colored effects, these may be painted with either oil or water-color onto the surface of the bottom of the mold, from which they are imparted to the material made in it. It is preferred, however, to color the surface of the material after manufacture in the following manner.

When colored marble or like effects are desired, slabs, tiles, or moldings prepared as described are employed, and these, if white or uncolored, are first coated with paint of the desired tint and stoved at a temperature of about 155°. The marbling or graining is then applied with colors in a usual manner and the material again stoved at a temperature of about 250°. It is then varnished and stoved at a temperature of 155°, finally rubbed down with rottenstone, and polished with the beeswax composition while yet warm from the stove.

Having now described my invention, what I claim, and desire to secure by Letters Patent, is—

1. The process of manufacturing artificial marble which consists in molding a composition consisting of Keene's marble-cement, white silver sand, ground alum and litharge, in the proportions named, mixed with water and allowed to set, coating same with enamel-paint and baking at a temperature of 155° Fahrenheit, polishing with rottenstone and water, coating with varnish and again stoving at above temperature and finally polishing with a composition of beeswax, turpentine and precipitated chalk substantially as set forth.

2. The process of manufacturing artificial marble which consists in molding a composition consisting of Parian cement, Keene's marble-cement, white silver sand, ground alum and litharge, in the proportions named, mixed with water and allowed to set, coating same with enamel-paint and stoving at a temperature of 155°, polishing with rottenstone and water, coating with varnish and again stoving at above temperature and finally polishing with a composition of beeswax, turpentine, and precipitated chalk substantially as set forth.

3. The process of manufacturing artificial marble which consists in molding a composition consisting of Parian cement, Keene's marble-cement, white silver sand, ground alum and litharge in the proportions named, mixed with water and allowed to set, coating same with enamel-paint, stoving at a temperature of 155°, polishing with rottenstone, varnishing and again stoving, graining the surface with colors and stoving at a temperature of 250° finally rubbing down with rottenstone and polishing with a composition of beeswax, turpentine and precipitated chalk substantially as set forth.

4. An artificial marble consisting of Parian cement, Keene's marble-cement, white silver sand, ground alum and litharge, in the proportions named.

In witness whereof I have signed my name to this specification in the presence of two subscribing witnesses.

JOHN TUCKWELL.

Witnesses:
R. C. THOMSON,
WM. RUTHERFORD.